US012235766B2

(12) United States Patent
Dai (10) Patent No.: US 12,235,766 B2
(45) Date of Patent: Feb. 25, 2025

(54) CXL MEMORY MODULE, MEMORY DATA SWAP METHOD AND COMPUTER SYSTEM (71) Applicant: BEIJING SUPERSTRING ACADEMY OF MEMORY TECHNOLOGY, Beijing (CN)

(72) Inventor: Jin Dai, Beijing (CN)

(73) Assignee: BEIJING SUPERSTRING ACADEMY OF MEMORY TECHNOLOGY, Beijing (CN)

(*) Notice: Subject to any disclaimer, the term of this patent is extended or adjusted under 35 U.S.C. 154(b) by 0 days.

(21) Appl. No.: 18/609,230

(22) Filed: Mar. 19, 2024

(65) Prior Publication Data
US 2024/0311305 A1 Sep. 19, 2024

Related U.S. Application Data (63) Continuation of application No. PCT/CN2023/097840, filed on Jun. 1, 2023.

(30) Foreign Application Priority Data

Mar. 17, 2023 (CN) .................. 202310266121.X (51) Int. Cl.
G06F 12/0817 (2016.01)
G06F 3/06 (2006.01)

(52) U.S. Cl.
CPC ........ *G06F 12/0828* (2013.01); *G06F 3/0604* (2013.01); *G06F 3/0655* (2013.01); *G06F 3/0679* (2013.01); *G06F 2212/621* (2013.01)

(58) Field of Classification Search
CPC .......................... G06F 12/0828; G06F 3/0604
See application file for complete search history.

(56) References Cited

U.S. PATENT DOCUMENTS

2014/0215129 A1* 7/2014 Kuzmin .............. G06F 12/0246
711/103
2021/0311643 A1 10/2021 Shanbhogue et al.
2021/0311897 A1 10/2021 Malladi et al.
(Continued)

FOREIGN PATENT DOCUMENTS

CN 101281777 A 10/2008
CN 105607862 A 5/2016
(Continued)

OTHER PUBLICATIONS

Gouk, Donghyun, et al. "Memory pooling with cxl." IEEE Micro 43.2 (Jan. 16, 2023): 48-57. [retrieved from internet May 10, 2024[<URL: https://ieeexplore.ieee.org/stamp/stamp.jsp?arnumber=10018233>] (Year: 2023).*

(Continued)

*Primary Examiner* — Hosain T Alam
*Assistant Examiner* — Nicholas A. Paperno
(74) *Attorney, Agent, or Firm* — Brooks Kushman, P.C.

(57) ABSTRACT

A CXL memory module, a memory data swap method and a computer system. The CXL memory module may include a flash memory chip, a memory chip, and a controller chip connected with the flash memory chip and the memory chip. The controller chip is configured to be able to swap a part of data in the memory chip into the flash memory chip.

26 Claims, 4 Drawing Sheets

(56) References Cited

U.S. PATENT DOCUMENTS

| | | | |
|---|---|---|---|
| 2021/0373951 A1 | 12/2021 | Malladi et al. | |
| 2022/0147476 A1 | 5/2022 | Nam et al. | |
| 2022/0253227 A1 | 8/2022 | Helmick | |
| 2022/0342568 A1* | 10/2022 | Roberts | G06F 3/0631 |
| 2023/0017643 A1 | 1/2023 | Shah et al. | |
| 2023/0017824 A1 | 1/2023 | Park et al. | |
| 2023/0028071 A1 | 1/2023 | Lee et al. | |
| 2024/0134522 A1* | 4/2024 | Park | G06F 12/0223 |

FOREIGN PATENT DOCUMENTS

| | | | | |
|---|---|---|---|---|
| CN | 112948149 A | 6/2021 | | |
| CN | 113360093 A | 9/2021 | | |
| CN | 113742257 A | 12/2021 | | |
| CN | 113742259 A | 12/2021 | | |
| CN | 113778907 A | 12/2021 | | |
| CN | 215769533 U | 2/2022 | | |
| CN | 114442916 A | 5/2022 | | |
| CN | 114880253 A | 8/2022 | | |
| CN | 115407839 A | 11/2022 | | |
| CN | 115543862 A | 12/2022 | | |
| CN | 115617503 A | 1/2023 | | |
| CN | 115617542 A * | 1/2023 | | G06F 9/4881 |
| CN | 115686153 A | 2/2023 | | |
| CN | 115687193 A | 2/2023 | | |
| CN | 115793953 A | 3/2023 | | |
| CN | 115794669 A | 3/2023 | | |
| JP | 2008159013 A | 7/2008 | | |
| WO | 2023035646 A1 | 3/2023 | | |
| WO | WO-2024078342 A1 * | 4/2024 | | G06F 9/4881 |

OTHER PUBLICATIONS

First Office Action for Chinese Application No. 202310266121.X, dated Sep. 5, 2023, 20 Pages including English Translation.

Notice of Allowance for Application No. 202310266121.X, dated Nov. 28, 2023, 8 Pages including English Translation.

* cited by examiner

CXL MEMORY MODULE, MEMORY DATA SWAP METHOD AND COMPUTER SYSTEM

CROSS-REFERENCE TO RELATED APPLICATION(S)

This application is a continuation of International PCT Application No. PCT/CN2023/097840 filed on Jun. 1, 2023, which claims the priority of Chinese Patent Application No. 202310266121.X, filed on Mar. 17, 2023, which are hereby incorporated herein by reference in their entireties.

TECHNICAL FIELD

The present disclosure relates to, but is not limited to, the field of storage, in particular to a CXL memory module, a memory data swap method and a computer system.

BACKGROUND

CXL is a memory interface protocol based on the PCIe physical layer. The CXL protocol enables memory expansion of computers with CXL memory modules. A CXL memory module is generally composed of a CXL controller chip and a group of DRAM chips.

As memory extension, a CXL memory module is cheaper than a traditional DIMM module for the same capacity, however the limitations of the DRAM chips themselves prevent the cost from being reduced.

SUMMARY

The following is a summary of subject matters described herein in detail. This summary is not intended to limit the scope of protection of the claims.

An embodiment of the present disclosure provides a CXL memory module, including a flash memory chip, a memory chip, and a controller chip connected to the flash memory chip and the memory chip, the controller chip is configured to be able to swap a part of data in the memory chip into the flash memory chip.

An embodiment of the present disclosure also provides a memory data swap method, applied to a host connected to a CXL memory module provided with a flash memory chip and a memory chip, includes: the host runs a virtual memory and maintains a correspondence of a logical address, a memory address and a flash memory address of data in a logical address-physical address translation table; when the host determines that there is insufficient memory space, the host sends a swap-out instruction to the CXL memory module, wherein the swap-out instruction carries an address of a first memory page in which data is stored and an address of a free first flash memory page, or carries an address of a first memory page in which the data is stored; and after receiving the swap-out completion response or the address of the first flash memory page sent by the CXL memory module, the host releases the first memory page, marks the memory address of the data as invalid, records the flash memory address of the data as the address of the first flash memory page and marks the flash memory address of the data as valid.

An embodiment of the present disclosure also provides a memory data swap method, applied to a CXL memory module provided with a flash memory chip and a memory chip, includes: the CXL memory module is able to swap a part of data in the memory chip into the flash memory chip.

An embodiment of the present disclosure also provides a controller chip of a CXL memory module. The controller chip includes a memory interface, a flash memory interface, and a storage controller connected to the memory interface and the flash memory interface, the storage controller is configured to execute the memory data swap method as described in any embodiment at the side of the CXL memory module.

An embodiment of the present disclosure also provides a host including a storage for storing execution instructions and a processor; the processor invokes the execution instructions and is configured to execute the memory data swap method as described in any embodiment at the side of the host.

An embodiment of the present disclosure also provides a computer system, which includes a host as described in any embodiment and a CXL memory module as described in any embodiment.

The CXL memory module, the memory data swap method and the computer system according to at least one embodiment of the present disclosure have the following beneficial effects as compared to the prior art: the CXL memory module also includes at least one group of flash memory chips, and when the space in the memory (DRAM chip) is not sufficient to be used, a part of the data in the memory is swapped to the flash memory chip, which can greatly expand the capacity with the flash memory chip at a lower cost, improve the price-performance ratio of the product, as well as can solve the difficulties in the swap caused by the limitation on the number of times for which the flash memory is erased or written.

Other aspects may be understood upon reading and understanding the drawings and detailed description.

BRIEF DESCRIPTION OF THE DRAWINGS

The accompanying drawings are used for providing understanding of technical solutions of the present disclosure, and form a part of the specification. They are used for explaining the technical solutions of the present disclosure together with the embodiments of the present disclosure, but do not form a limitation on the technical solutions of the present disclosure.

DETAILED DESCRIPTION

Embodiments of the present disclosure will be described in detail with reference to the accompanying drawings. The embodiments in the present disclosure and the features in the embodiments may be combined with each other arbitrarily if there is no conflict.

Multiple embodiments are described herein, but the description is exemplary rather than restrictive, and to those of ordinary skills in the art, there may be more embodiments and implementation solutions within the scope contained in the embodiments described herein. Although many possible combinations of features are shown in the accompanying drawings and discussed in specific implementations, many other combinations of the disclosed features are also possible. Unless expressly limited, any feature or element of any embodiment may be used in combination with, or may replace, any other feature or element in any other embodiment.

The present disclosure includes and contemplates combinations with features and elements known to those of ordinary skills in the art. The disclosed embodiments, features and elements of the present disclosure may also be combined with any conventional features or elements to form the solutions defined by the claims. Any feature or element of any embodiment may also be combined with features or elements from other disclosed solutions to form another solution defined by the claims. Accordingly, it should be understood that any of the features shown and discussed in the present disclosure may be implemented alone or in any suitable combination. Therefore, the embodiments are not to be limited except the limitation by the appended claims and equivalents thereof. Moreover, various modifications and variations may be made within the scope of the appended claims.

Moreover, when representative embodiments are described, the specification may have presented a method and a process as a particular order of acts. However, to an extent that the method or process does not depend on a specific order of the acts in present disclosure, the method or process should not be limited to the acts in the specific order. Those of ordinary skills in the art will understand that other orders of acts may also be possible. Therefore, the specific order of the acts illustrated in the specification should not be interpreted as a limitation on claims. In addition, the claims with respect to the method and process should not be limited to executing their acts according to the written order. Those skilled in the art may easily understand that these orders may change, and are still in the spirit and scope of the embodiments of the disclosure.

Figure 1:
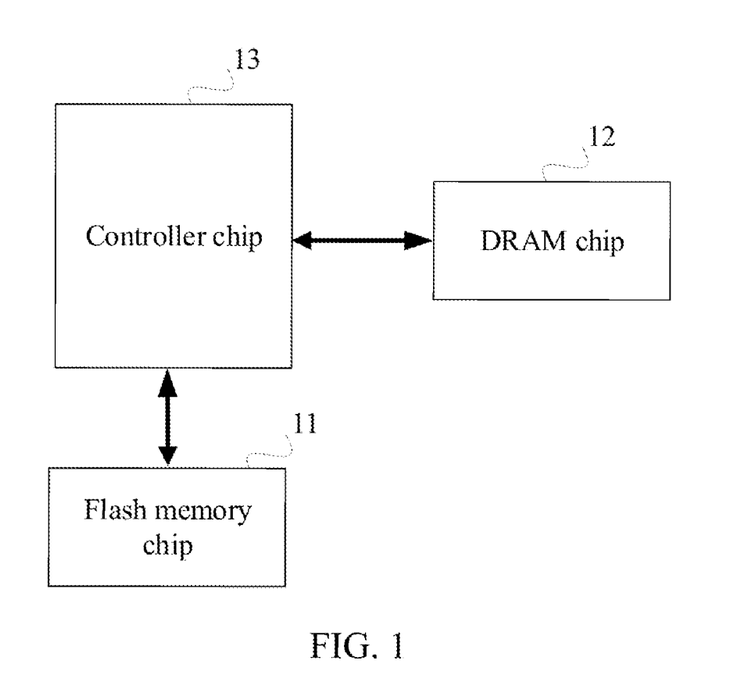
FIG. 1 is a block diagram of a structure of a CXL memory module according to an exemplary embodiment of the present disclosure.
Figure 2:
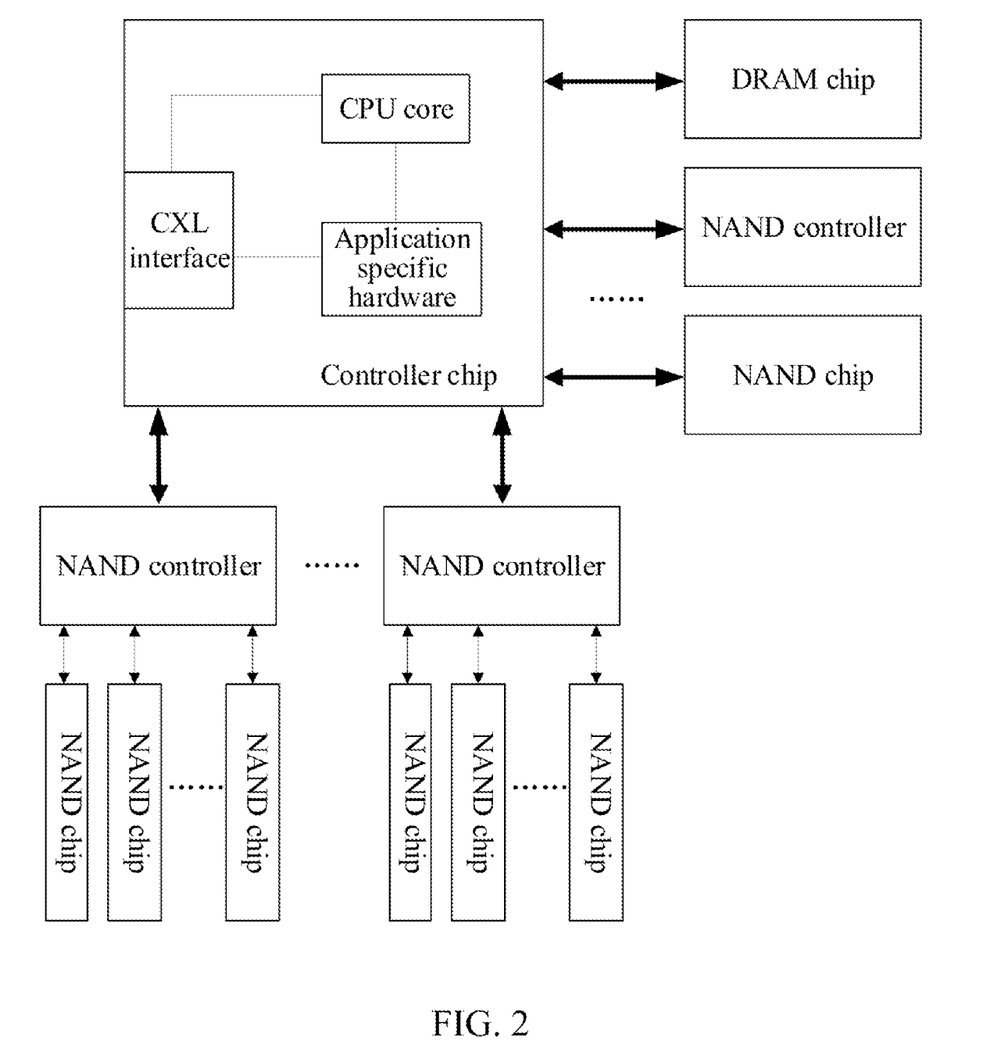
FIG. 2 is a block diagram of a structure of a CXL memory module according to another exemplary embodiment of the present disclosure.

FIG. 1 is a block diagram of a structure of a CXL memory module according to an exemplary embodiment of the present disclosure, and FIG. 2 is a block diagram of a structure of a CXL memory module according to another exemplary embodiment of the present disclosure. As shown in FIGS. 1 and 2, the CXL memory module may include a flash memory chip 11, a memory chip, and a controller chip 13 connected to the flash memory chip and the memory chip, the memory chip may be a DRAM chip 12, and the controller chip is configured to be able to swap a part of data in the memory chip (such as a DRAM chip) into the flash memory chip.

The CXL memory module according to an embodiment of the present disclosure includes at least one group of flash memory chips in addition to the memory chip. When there is insufficient memory space in the memory (such as DRAM chip), a part of the data of the memory is swapped to the flash memory chip, and then read out of the flash memory chip when needed. The data swap may include data swap-out and data swap-in. The data swap-out refers to writing data in the memory chip into the flash memory chip, and the data swap-in refers to writing data in the flash memory into the memory chip.

Embodiments of the present disclosure can significantly expand capacity with lower cost flash memory chips, improve the product price/performance ratio, as well as can solve the difficulties in the swap caused by the limitation on the number of times for which the flash memory is erased or written.

In an exemplary embodiment of the present disclosure, a way of using flash memories may be as follows: the controller chip of the CXL memory module connects to a flash memory control chip (such as a NAND controller in FIG. 2), and then connects to a group of flash memory chips (such as the NAND chips in FIG. 2) and manages them through the flash memory control chip, wherein one group of flash memory chips may include one or more flash memory chips.

In an exemplary embodiment of the present disclosure, as shown in FIG. 2, the controller chip of the CXL memory module may be connected with a plurality of flash memory control chips, one flash memory control chip may connect to and manage a group of flash memory chips, and one group of flash memory chips may include one or more flash memory chips. The controller chip of the CXL memory module is connected with a plurality of flash memory control chips, which can increase the read/write bandwidth of the flash memories.

In an exemplary embodiment of the present disclosure, the controller chip may be configured to perform data swap by the following: receiving a swap-out instruction sent by an external device, wherein the swap-out instruction carries an address of a first memory page in which data is stored, the controller chip selects a free first flash memory page from the flash memory chip, swaps the data in the first memory page into the first flash memory page, and returns an address of the first flash memory page to the external device. Herein, the external device may include a host.

In an embodiment of the present disclosure, a host leading mode may be adopted, the host may detect whether there is sufficient memory to be used, and the host determines information of data that needs to be swapped to the flash memory chip when there is insufficient memory space. The information of the data may include an address in the memory occupied by the data that needs to be swapped to the flash memory chip.

The CXL memory module may send information of a total amount of available memory space of DRAM chips, to the host. The host runs a virtual memory and maintains a correspondence of a logical address, a memory address and a flash memory address of data in a logical address-physical address translation table. When determining that there is insufficient memory space, the host sends a swap-out instruction to the CXL module, wherein the swap-out instruction carries an address of a first memory page in which data is stored.

Insufficient memory space may mean that the remaining memory space is less than a threshold, or the remaining memory space is less than the requested memory space, etc.

The content of a software application usually includes many memory pages, most of which are read-only. The read-only memory pages may include program codes and read-only data, the read-only data may be, for example, a large number of icon pictures or weights in artificial intelligence reasoning, and only a few of memory pages are read and written. The operating system has a mark for the read-write attribute of each memory page.

In an example, a first memory page is a read-only page or preferentially a read-only page. The host records the read-write attribute of each memory page, including read-only pages or read-write pages. In data swap, only the data of read-only memory pages are swapped, or the data of read-only memory pages are swapped preferentially.

Preferential swap means that read-only memory pages have a higher priority than other memory pages (such as read-write memory pages). For example, for memory pages that will be not used in a near future, only after data swap is performed on all memory pages that store read-only data, data swap is performed on memory pages that store read-write data.

The CXL memory module receives a swap-out instruction, selects a free first flash memory page from the flash memory chip, swaps the data in the first memory page to the first flash memory page, and returns an address of the first flash memory page to the host.

In an embodiment of the present disclosure, when detecting that the memory is insufficient, the host may send a swap-out instruction through the cxl.io protocol to specify the CXL memory module to store data of an address segment into the flash memory chip. The CXL memory module may select a flash memory address, read the data of the address segment from the memory to the flash memory address, and return the flash memory address to the host.

After receiving the address of the first flash memory page sent by the CXL memory module, the host releases the first memory page, marks the memory address of the data as invalid, and records the flash memory address of the data as the address of the first flash memory page and marks it as valid.

The host uses a virtual memory for management, and the data swapped to the flash memory still retains the same logical address, but the information of the data is marked accordingly, with the mark including the address of the data in the flash memory.

In another exemplary embodiment, the controller chip is configured to perform data swap by the following: upon receiving a swap-out instruction sent by an external device, wherein the swap-out instruction carries an address of a first memory page in which data is stored and an address of a free first flash memory page, the controller chip swaps the data in the first memory page to the first flash memory page and returns a swap-out completion response to the external device.

In an embodiment of the present disclosure, a host leading mode is adopted, and the host detects whether there is sufficient memory to be used, and determines information of data that needs to be swapped to the flash memory chip when there is insufficient memory space. The information of the data may include an address in the memory occupied by the data that needs to be swapped to the flash memory chip and an address of a flash memory page occupied by the data to be swapped to the flash memory chip.

The embodiment of the present disclosure differs from the above-mentioned host-leading embodiment in that in the above-mentioned host-leading embodiment, the swap-out instruction sent by the host only carries an address of a first memory page in which data is stored, and does not carry or specify an address of a flash memory page required for data swap to the flash memory chip, and the flash memory page required for data swap to the flash memory chip is determined by the CXL memory module. In the embodiment of the present disclosure, the swap-out instruction sent by the host not only carries the address of the first memory page in which the data is stored, but also carries the address of the flash memory page required for data swap to the flash memory chip, that is, the flash memory page required for data swap to the flash memory chip is determined by the host.

The CXL memory module may send information of a total amount of available memory space of DRAM chips, to the host. The host runs a virtual memory and maintains a correspondence of a logical address, a memory address and a flash memory address of data in a logical address-physical address translation table. When determining that there is insufficient memory space, the host sends a swap-out instruction to the CXL module, wherein the swap-out instruction carries an address of a first memory page in which data is stored and an address of a free first flash memory page.

Upon receiving the swap-out instruction, the CXL memory module swaps the data in the first memory page to the first flash memory page specified by the host, and returns a swap-out completion response to the host. After receiving the swap-out completion response sent by the CXL memory module, the host releases the first memory page, marks the memory address of the data as invalid, and records the flash memory address of the data as the address of the first flash memory page and marks it as valid.

In an embodiment of the present disclosure, when detecting that the memory is insufficient, the host may send a swap-out instruction through the cxl.io protocol to specify the CXL memory module to store data of an address segment into a specified flash memory page in the flash memory chip. The CXL reads the data of this address segment from the memory to the flash memory address specified by the host, and returns a swap-out completion response to the host.

In an exemplary embodiment of the present disclosure, the controller chip may include a CXL interface configured to be connected with the host. The host may send instructions through the cxl.io protocol, and the sent instructions may include a swap-out instruction, a swap-in instruction and a memory request instruction in the following embodiments, etc.

In an exemplary embodiment of the present disclosure, the controller chip may also be configured to, receive a swap-in instruction sent by an external device, wherein the swap-in instruction carries an address of a first flash memory page and an address of a free second memory page; and reads data from the first flash memory page, writes the data into the second memory page, and returns a swap-in completion response to the external device.

When receiving a request to read data (such as a request sent by a process to read data), the host searches for a memory address and flash memory address of the data according to a logical address of the data. When the searched-out memory address is invalid and the searched-out flash memory address is valid, the host sends a swap-in instruction to the CXL memory module, wherein the swap-in instruction carries an address of a first flash memory page and an address of a free second memory page.

After data of the read-only page is swapped to the flash memory, the data in the flash memory is still retained, and the corresponding flash memory address is retained in the information of the data. When the data of the read-only page is used again, the data is restored from the same flash memory address.

After receiving the swap-in instruction sent by the host, the CXL memory module reads data from the first flash memory page, writes the data into the second memory page, and returns a swap-in completion response to the host. After receiving the swap-in completion response returned by the CXL memory module, the host records the memory address of the data as the address of the second memory page and marks it as valid.

When the swapped-out data needs to be used, the read/write operation to the corresponding logical address will trigger the virtual memory management mechanism of the host, the host will read the data from the corresponding address in the flash memory to a new memory address according to the corresponding mark, and modify the correspondence between the logical address, the memory address, and the flash memory address of the data in the logical address-physical address translation table, so that the new memory address corresponds to the same logical address. If there is not sufficient free space in the memory, other memory pages may be swapped-out first.

In an exemplary embodiment of the present disclosure, the controller chip may further be configured to, receive a swap-in instruction sent by an external device, wherein the swap-in instruction carries an address of a first flash memory page; and selects a free second memory page from the memory (such as a DRAM chip), reads data from the first flash memory page, writes the data into the second memory page, and returns a swap-in completion response to the external device.

The embodiment of the present disclosure differs from the above-mentioned embodiment. The difference is that the swap-in instruction sent by the host in the above-mentioned embodiment not only carries the address of the first flash memory page where the data to be read is located, but also carries the address of the memory page that needs to be occupied by data which will be read to the DRAM chip, i.e., the memory page that needs to be occupied by data which will be read to the memory (such as the DRAM chip) is determined by the host; the swap-in instruction sent by the host in the embodiment of the present disclosure only carries the address of the first flash memory page where the data to be read is located, and does not carry or specify the address of the memory page that needs to be occupied by the data which will be read to the flash memory chip, and the memory page that needs to be occupied by the data which will be swapped to the memory (such as the DRAM chip) is determined by the CXL memory module.

In an exemplary embodiment of the present disclosure, when determining to release the second memory page in which the data is stored, the host searches for the correspondence and statuses of the logical address, the memory address and the flash memory address of the data. When the flash memory address of the data is determined to be valid, the second memory page is directly released, and the memory address of the data is marked as invalid.

When it is in a host leading mode, the memory space occupied by data may be released by the host. After the swap is completed, or when the data of the read-only page needs to be swapped out of the memory again, the host may mark the corresponding memory page as free and release the corresponding memory page.

When the data of the read-only page needs to be swapped out of the memory again, that is, when the data is not swapped-out for the first time, since the data is stored in the flash memory page to which the data was first swapped, no further flash memory writing is performed, the memory space occupied by the data is directly released, the memory address of the data is marked as invalid, and the data is no longer swapped to the flash memory chip.

It can be determined that the data is not swapped-out for the first time when the flash memory address of the data is valid by searching for the correspondence and statuses of the logical address, the memory address and the flash memory address of the data.

In an exemplary embodiment of the present disclosure, upon completion of a process using memory, all read-only pages and flash memory pages used by data of the process are released. When it is in the host leading mode, the memory space occupied by data may be released by the host. When the process using the memory ends and it is determined that the read-only page will no longer be used, the host releases the corresponding memory space and flash memory space.

In an exemplary embodiment of the present disclosure, the controller chip runs a virtual memory and maintains a correspondence of a logical address, a memory address and a flash memory address of data in a logical address-physical address translation table; the controller chip is configured to perform data swap by the following: when the controller chip receives a memory request instruction sent by an external device and/or the controller chip manages a memory, the controller chip determines that there is insufficient allocatable memory in the memory chip, initiates data swap, and swaps a part of the data in the memory chip into a free area of the flash memory chip.

The embodiment of the present disclosure may determine whether there is sufficient memory space, and information of data that needs to be swapped to the flash memory chip when there is not sufficient memory space, through a self-leading mode of the CXL memory module.

The self-leading mode may determine whether there is insufficient allocatable memory in the memory chip in at least one of two modes.

A first implementation mode: when receiving a memory request instruction sent by an external device, the CXL memory module determines whether there is insufficient allocatable memory in the memory chip, wherein the memory request instruction carries a read-write attribute for each requested memory page, and the read-write attribute is a read-only page or a read-write page.

The CXL memory module runs a virtual memory, and an external device (such as a host) reads from and writes to the memory by the logical address; when the host needs to increase the capacity, the host may send a memory request instruction to the CXL memory module, wherein the memory request instruction carries a read-write attribute for each requested memory page, and the read-write attribute is a read-only page or a read-write page.

The host sends a memory request instruction to the CXL memory module to inform the CXL memory module of memory page information required by itself. For example, the memory request instruction may indicate that the space of 5 memory pages needs to be requested, and there should be 3 read-only pages and 2 read-write pages among the 5 memory pages.

After receiving the memory request instruction sent by the host, the CXL memory module compares the remaining memory space with the memory space to be requested by the memory request instruction, and determines that there is insufficient allocatable memory in the memory chip when the remaining memory space is less than the requested memory space.

When the CXL memory module determines that there is insufficient allocatable memory in the memory chip, it initiates data swap. During data swap, only the data in the read-only page in the memory chip is swapped, or the data in the read-only page in the memory chip is preferentially swapped.

The CXL memory module may learn the read-write attribute of the memory page in which the data has been stored in the DRAM chip according to the attribute of the memory page to which the data was previously written, and swap or preferentially swap the data in the read-only page in the memory chip to a free area (a free flash memory page) of the flash memory chip.

After the CXL memory module swaps or preferentially swaps the data in the read-only page in the memory chip to a free area (a free flash memory page) of the flash memory chip, the CXL memory module marks the information of the free area correspondingly: updating the correspondence table of the logical address, the memory address and the flash memory address of the data, updating the flash memory address of the data as the address of the free flash memory page and marking it as valid, and marking the memory address as invalid. The data swapped to the flash memory chip still remains the same logical address, i.e., the CXL memory module marks the information of the data accordingly, and the mark includes the address of the data in the flash memory chip.

A second implementation mode: when the controller chip manages the memory, the controller chip determines whether there is insufficient allocatable memory in the memory chip.

The CXL memory module uses a virtual memory management mechanism, when it detects that the remaining memory space is less than a threshold, it determines that there is insufficient allocatable memory in the memory chip.

When the CXL memory module determines that there is insufficient allocatable memory in the memory chip, the CXL memory module initiates data swap. During data swap, only the data of memory pages which will not be used in a preset period of time is swapped.

The controller chip may further be configured to count usage time of memory pages in the memory chip. The CXL memory module runs a virtual memory and counts the usage time of each memory page in the DRAM chip. When there is insufficient allocatable memory in the DRAM chip, data swap is initiated, to swap the data of the memory pages which will not be used in a preset near future to (a free flash memory page of) the flash memory chip.

After the CXL memory module swaps the data of memory pages of the flash memory chip which will not be used in a preset period of time to a free area (a free flash memory page) of the flash memory chip, the CXL memory module marks the information of the free area correspondingly: updating a correspondence table of a logical address, a memory address and a flash memory address of the data, updating the flash memory address of the data as the address of the free flash memory page and marking it as valid, and marking the memory address as invalid. The data swapped to the flash memory chip still remains the same logical address, i.e., the CXL memory module marks the information of the data accordingly, and the mark includes the address of the data in the flash memory chip.

In an exemplary embodiment of the present disclosure, a part of the data in the memory chip may include first data in a read-only page in the memory chip, and the controller chip swaps the part of the data in the memory chip into a free area of the flash memory chip, which may include: detecting whether the first data is swapped-out for the first time; when the first data is swapped-out for the first time, swapping the first data into a free flash memory page of the flash memory chip, and recording the flash memory address of the first data as the address of the free flash memory page and marking it as valid.

Herein, the first data refers to the data in a read-only page that needs to be swapped from the memory chip to the flash memory chip, and the first data may also be referred to as swapped data or swapped-out data.

For the swap of the data in a read-only page, the CXL memory module detects whether the first data to be swapped from the memory chip to the flash memory chip is swapped-out for the first time. When the first data is swapped-out for the first time, the CXL memory module swaps the first data into a free flash memory page of the flash memory chip, records the address of the free flash memory page and marks it as valid.

In an exemplary embodiment of the present disclosure, the controller chip detects whether the first data is swapped-out for the first time, which may include: searching for statuses of a memory address and a flash memory address of the first data; when it is determined that the memory address of the first data is valid and the flash memory address is invalid, deciding that the first data is swapped-out for the first time; when it is determined that the flash memory address of the first data is valid, deciding that the first data is not swapped-out for the first time.

The CXL memory module, for the swap of the data in a read-only page, searches for the correspondence table and the marked statuses of the logical address, the memory address and the flash memory address of the data, determines the statuses of the memory address and the flash memory address of the first data to be swapped from the memory chip to the flash memory chip. When it is determined that the memory address of the first data is valid and the flash memory address is invalid, the CXL memory module decides that the first data is swapped-out for the first time; when it is determined that the flash memory address of the first data is valid, the CXL memory module decides that the first data is not swapped-out for the first time. Through the correspondence table and the marked statuses of the logical address, the memory address and the flash memory address of the data, it can be determined whether the data is swapped for the first time.

After the first data is swapped to a free flash memory page of the flash memory chip, the CXL memory module marks the information of the free area correspondingly: updating the correspondence table of the logical address, the memory address and the flash memory address of the data, updating the flash memory address of the data as the address of the free flash memory page and marking it as valid, and marking the memory address as invalid. After the data of the read-only page is swapped to the flash memory chip, the CXL memory module marks the information of the data accordingly, and the mark includes the address of the data in the flash memory chip, so as to retain the corresponding flash memory address in the information of the data.

In an exemplary embodiment of the present disclosure, the controller chip may further be configured to directly release the read-only page and mark the memory address of the first data as invalid when the first data is not swapped-out for the first time.

When it is determined that the first data is not swapped-out for the first time, that is, the first data needs to be swapped-out of the memory again, no further flash memory writing is performed, and the memory space is directly released.

In an exemplary embodiment of the present disclosure, the controller chip may further be configured to: when determining that the first data needs to be swapped-in after the first data is swapped into the free area of the flash memory chip, read the first data from the recorded flash memory address of the first data, write the first data to a free memory page selected from the memory chip, and update the memory address of the first data as the address of the free memory page and mark it as valid.

After the first data is swapped into the free area of the flash memory chip, when the first data is used again, the first data is restored from the same flash memory address.

When the swapped-out first data needs to be used, the read/write operation to the corresponding logical address will trigger a virtual memory management mechanism of the CXL memory module. The CXL memory module will read the first data from the corresponding address in the flash memory to a new memory address according to the corresponding mark, and modify the correspondence between the logical address, the memory address, and the flash memory address of that data in the logical address-physical address translation table, so that the new memory address corresponds to the same logical address.

In an exemplary embodiment of the present disclosure, the controller chip determines that the first data needs to be swapped-in, which may include: receiving a request from an external device to read the first data, wherein the request carries a logical address of the first data; searching out that the flash memory address of the first data is valid and the memory address is invalid, determining that the first data needs to be swapped-in. The controller chip may further be configured to, after reading the first data from the flash memory address where the first data is recorded, return the read first data to the external device.

After the external device (such as the host) receives the request to read the first data, the host sends a data read instruction to the CXL memory module, and the data read instruction carries the logical address where the data to be read is located. The CXL memory module searches for the correspondence table and the marked statuses of the logical address, the memory address and the flash memory address of the data. When the memory address corresponding to the logical address is invalid but the flash memory address is valid, it is determined that the first data needs to be swapped-in, and the CXL memory module will read the first data from the corresponding address in the flash memory to a new memory address according to the corresponding mark. The CXL memory module reads the first data from the flash memory address where the first data is recorded according to the flash memory address of the first data in the flash memory chip, and returns the read first data to the host.

In an exemplary embodiment of the present disclosure, the controller chip may further be configured to, upon completion of a process using memory, release all read-only pages and flash memory pages used by data of the process.

In an exemplary embodiment of the present disclosure, upon completion of a process using memory, all read-only pages and flash memory pages used by data of the process are released. When it is in a CXL memory module leading mode, when the process using memory ends and it is confirmed that the read-only page will no longer be used, the CXL memory module releases the corresponding memory space and flash memory space.

An embodiment of the present disclosure also provide a memory data swap method, applied to a CXL memory module provided with a flash memory chip and a memory chip. The memory data swap method may include: the CXL memory module is able to swap a part of data in the memory chip into the flash memory chip.

The memory data swap method according to an embodiment of the present disclosure is suitable for a CXL memory module including at least one group of flash memory chips. When there is insufficient memory space in the memory (DRAM chip), a part of the data of the memory is swapped to the flash memory chip, and then read out of the flash memory chip when needed.

The execution body of the memory data swap method according to an embodiment of the present disclosure is the CXL memory module described in any embodiment, and its implementation principle and implementation effect are similar, which will not be repeated here.

In an exemplary embodiment of the present disclosure, the CXL memory module runs a virtual memory and maintains a correspondence of a logical address, a memory address and a flash memory address of data in a logical address-physical address translation table, and the CXL memory module may performs data swap by the following: when receiving a memory request instruction sent by an external device and/or managing a memory, determining that there is insufficient allocatable memory in the memory chip, initiating data swap, and swapping a part of the data in the memory chip into a free area of the flash memory chip.

In an exemplary embodiment of the present disclosure, the memory request instruction may carry a read-write attribute for each requested memory page, and the read-write attribute is a read-only page or a read-write page; the CXL memory module, when initiating data swap, swaps only the data in the read-only page in the memory chip, or preferentially swaps the data in the read-only page in the memory chip.

In an exemplary embodiment of the present disclosure, the memory data swap method may further include: counting usage time of memory pages in the memory chip; the CXL memory module, when initiating data swap, swaps only the data of the memory pages which will not be used in a preset period of time.

In an exemplary embodiment of the present disclosure, the part of the data in the memory chip may include a first data in a read-only page in the memory chip, and the CXL memory module swaps a part of the data in the memory chip into a free area of the flash memory chip, which may include: detecting whether the first data is swapped-out for the first time; and when the first data is swapped-out for the first time, swapping the first data into a free flash memory page of the flash memory chip, and recording the flash memory address of the first data as the address of the free flash memory page, and marking it as valid.

In an exemplary embodiment of the present disclosure, the CXL memory module detects whether the first data is swapped-out for the first time, which may include: searching for statuses of the memory address and the flash memory address of the first data; when it is determined that the memory address of the first data is valid and the flash memory address is invalid, deciding that the first data is swapped-out for the first time; and when it is determined that the flash memory address of the first data is valid, deciding that the first data is not swapped-out for the first time.

In an exemplary embodiment of the present disclosure, the memory data swap method may further include: after the first data is swapped to a free area of the flash memory chip, upon determining that the first data needs to be swapped-in, reading the first data from a recorded flash memory address of the first data, writing the first data to a free memory page selected from the memory chip, and updating the memory address of the first data as an address of the free memory page and marking it as valid.

In an exemplary embodiment of the present disclosure, the CXL memory module determines that the first data needs to be swapped-in, which may include: receiving a request from an external device to read the first data, wherein the request carries a logical address of the first data; and searching out that the flash memory address of the first data is valid and the memory address is invalid, determining that the first data needs to be swapped-in. The memory data swap method may further include: after reading the first data from the flash memory address where the first data is recorded, returning the read first data to the external device.

In an exemplary embodiment of the present disclosure, the memory data swap method may further include: directly releasing the read-only page when the first data is not swapped-out for the first time, marking the memory address of the first data as invalid.

In an exemplary embodiment of the present disclosure, the memory data swap method may further include: upon completion of a process using memory, releasing all read-only pages and flash memory pages used by data of the process.

In an exemplary embodiment of the present disclosure, the CXL memory module may perform data swap by the following: receiving a swap-out instruction sent by an external device, wherein the swap-out instruction carries an address of a first memory page in which the data is stored and an address of a free first flash memory page, the CXL memory module swaps the data in the first memory page into the first flash memory page, and returns a swap-out completion response to the external device; or, receiving a swap-out instruction sent by an external device, wherein the swap-out instruction carries an address of a first memory page in which the data is stored, the CXL memory module selects a free first flash memory page from the flash memory chip, swaps the data in the first memory page into the first flash memory page, and returns the address of the first flash memory page to the external device.

In an exemplary embodiment of the present disclosure, the first memory page may be a read-only page.

In an exemplary embodiment of the present disclosure, the memory data swap method may further include: the CXL memory module receives a swap-in instruction sent by the external device, wherein the swap-in instruction carries the address of the first flash memory page and the address of a free second memory page; and the CXL memory module reads the data from the first flash memory page, writes the data into the second memory page, and returns a swap-in completion response to the external device.

In an exemplary embodiment of the present disclosure, the memory data swap method may further include: the CXL memory module receives a swap-in instruction sent by the external device, wherein the swap-in instruction carries the address of the first flash memory page; and the CXL memory module selects a free second memory page from a memory (such as a DRAM chip), reads the data from the first flash memory page, writes the data into the second memory page, and returns a swap-in completion response to the external device.

Figure 3:
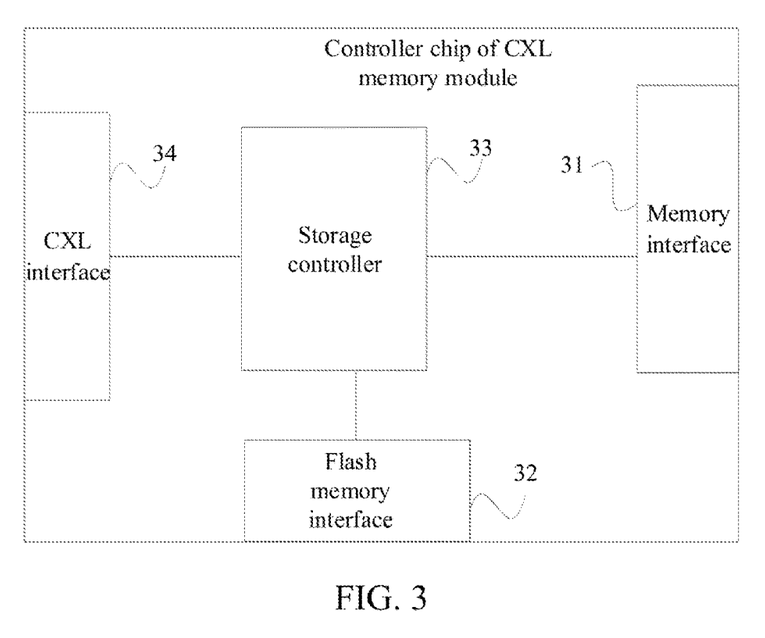
FIG. 3 is a block diagram of a structure of a controller chip of a CXL memory module according to an embodiment of the present disclosure.

FIG. 3 is a block diagram of a structure of a controller chip of a CXL memory module according to an embodiment of the present disclosure. As shown in FIG. 3, the controller chip includes a memory interface 31, a flash memory interface 32, and a storage controller 33 connected to the memory interface and the flash memory interface.

The storage controller may be a Central Processing Unit (CPU), or an Application Specific Integrated Circuit (ASIC), or one or more integrated circuits completing the implementation of embodiments of the present disclosure. The storage controller is configured to execute the memory data swap method as described in any embodiment at the side of the CXL memory module.

In an exemplary embodiment of the present disclosure, as shown in FIG. 2, one embodiment of the controller chip may be implemented by an embedded CPU core and application specific hardware such as programmable hardware.

In an exemplary embodiment of the present disclosure, as shown in FIG. 3, the controller chip may further include a CXL interface 34 configured to be connected with a host which may connect to the CXL memory module through the CXL interface of the controller chip.

Figure 4:
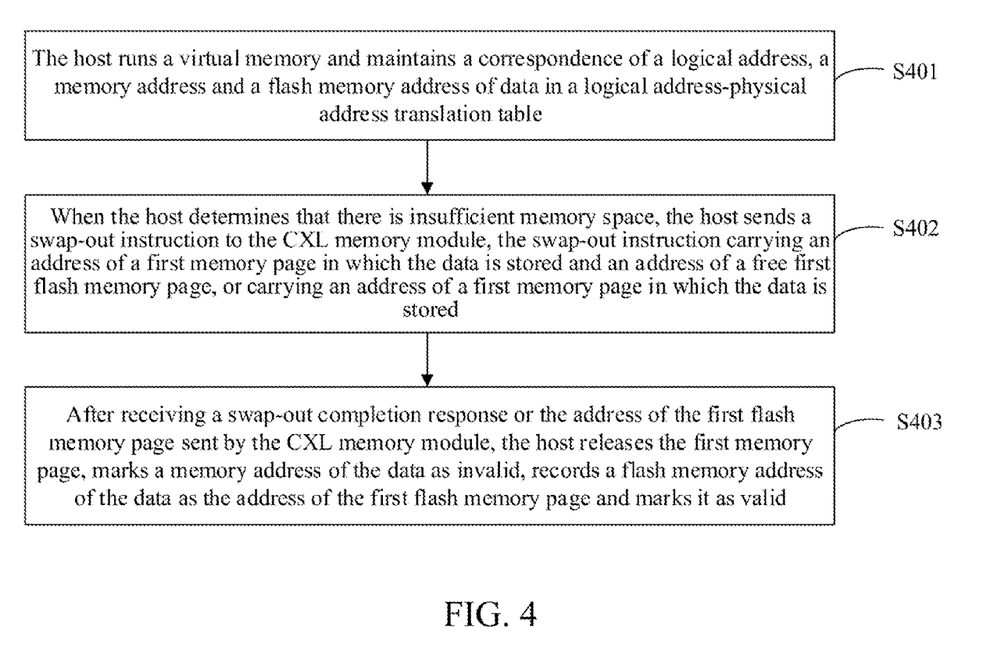
FIG. 4 is a flowchart of a memory data swap method according to an exemplary embodiment of the present disclosure.

An embodiment of the present disclosure further provides a memory data swap method, which is applied to a host connected with a CXL memory module provided with a flash memory chip and a memory chip (such as a DRAM chip). FIG. 4 is a flowchart of a memory data swap method according to an exemplary embodiment of the present disclosure. As shown in FIG. 4, the memory data swap method may include the following acts S401-S403.

In S401, the host runs a virtual memory and maintains a correspondence of a logical address, a memory address and a flash memory address of data in a logical physical address translation table.

In an embodiment of the present disclosure, a host leading mode may be adopted, the host may detect whether there is sufficient memory to be used, and determine information of data that needs to be swapped to the flash memory chip when there is insufficient memory space. The data information may include an address in the memory occupied by the data that needs to be swapped to the flash memory chip.

The CXL memory module may send information of a total amount of available memory space of DRAM chips, to the host. The host runs a virtual memory and maintains a correspondence of a logical address, a memory address and a flash memory address of data in a logical address-physical address translation table.

In S402, when the host determines that there is insufficient memory space, the host sends a swap-out instruction to the CXL memory module, wherein the swap-out instruction carries an address of a first memory page in which the data is stored and an address of a free first flash memory page, or carries an address of a first memory page in which the data is stored.

When the host detects that the memory is insufficient, the host may send instructions through the cxl.io protocol to specify the CXL memory module to store the data of an address segment into the flash memory chip. The CXL memory module may select the flash memory address, read the data of the address segment from the memory to the flash memory address, and return the flash memory address to the host. Alternatively, the host may specify a flash memory address to the CXL memory module, and the CXL memory module reads the data of the address segment from the memory to the flash memory address specified by the host, and returns a swap-out completion response to the host.

In S403, after receiving the swap-out completion response or the address of the first flash memory page sent by the CXL memory module, the host releases the first memory page, marks the memory address of the data as invalid, records the flash memory address of the data as the address of the first flash memory page and mark it as valid.

The host uses a virtual memory for management, and the data swapped to the flash memory still retains the same logical address, but the information of the data is marked accordingly, with the mark including the address of the data in the flash memory.

The execution body of the memory data swap method according to an embodiment of the present disclosure is the host described in any embodiment, and its implementation principle and implementation effect are similar, which will not be repeated here.

In an exemplary embodiment of the present disclosure, the first memory page may be a read-only page. The host records the read-write attributes of each memory page, including a read-only page or read-write page. In data swap, only the data of read-only memory pages are swapped, or the data of read-only memory pages are swapped preferentially.

In an exemplary embodiment of the present disclosure, the memory data swap method may further include: upon receiving a request to read the data, searching for, by the host, the memory address and the flash memory address of the data according to the logical address of the data; when the searched-out memory address is invalid and the searched-out flash memory address is valid, sending a swap-in instruction to the CXL memory module, wherein the swap-in instruction carries the address of the first flash memory page and the address of a free second memory page; and after receiving the swap-in completion response returned by the CXL memory module, recording the memory address of the data as the address of the second memory page and marking it as valid.

When receiving a request to read data, the host searches for the memory address and flash memory address of the data according to the logical address of the data. When the searched-out memory address is invalid and the searched-out flash memory address is valid, the host sends a swap-in instruction to the CXL memory module, wherein the swap-in instruction carries an address of a first flash memory page and an address of a free second memory page.

After the data of the read-only page is swapped into the flash memory, the data in the flash memory is still retained, and the corresponding flash memory address is retained in the data information. When the data of the read-only page is used again, the data is restored from the same flash memory address.

After receiving a swap-in instruction sent by the host, the CXL memory module reads the data from the first flash memory page, writes the data into the second memory page, and returns a swap-in completion response to the host. After receiving the swap-in completion response returned by the CXL memory module, the host records the memory address of the data as the address of the second memory page and marks it as valid.

When the swapped-out data needs to be used, the read/write operation to the corresponding logical address will trigger the virtual memory management mechanism of the host, the host will read the data from the corresponding address in the flash memory to a new memory address according to the corresponding mark, and modify the correspondence between the logical address, the memory address, and the flash memory address of the data in the logical physical address translation table, so that the new memory address corresponds to the same logical address. If there is not sufficient free space in the memory, other memory pages are swapped out.

In an exemplary embodiment of the present disclosure, the memory data swap method may further include: when determining the release of the second memory page storing the data, searching for the correspondence and statuses of a logical address, a memory address, and a flash memory address of the data; and when the flash memory address of the data is determined to be valid, directly releasing the second memory page, and marking the memory address of the data as invalid.

When it is in the host leading mode, the memory space occupied by data may be released by the host. After the swap is completed, or when the data of the read-only page needs to be swapped-out of the memory again, the host may mark the corresponding memory page as free and release the corresponding memory page.

When the data of the read-only page needs to be swapped-out of the memory again, that is, when the data is not swapped-out for the first time, no further flash memory writing is performed, the memory space occupied by the data is directly released, the memory address of the data is marked as invalid, and the data that needs to be swapped again is no longer swapped into the flash memory chip.

It can be determined that the data is not swapped-out for the first time and the flash memory address of the data is valid by searching for the correspondence and statuses of the logical address, the memory address and the flash memory address of the data.

In an exemplary embodiment of the present disclosure, the memory data swap method may further include: reading and writing, by the host, the memory by the logical address; and when the host needs to increase a capacity, sending, by the host, a memory request instruction to the CXL memory module, wherein the memory request instruction carries a read-write attribute for each memory page requested, and the read-write attribute is a read-only page or a read-write page.

The embodiment of the present disclosure may determine whether there is sufficient memory space, and information of the data that needs to be swapped to the flash memory chip when there is not sufficient memory space, through a self-leading mode of the CXL memory module.

The CXL memory module runs a virtual memory, and an external device (such as a host) reads from and writes to the memory by the logical address; when the host needs to increase the capacity, the host may send a memory request instruction to the CXL memory module, wherein the memory request instruction carries a read-write attribute for each memory page requested, and the read-write attribute is a read-only page or a read-write page.

The host sends a memory request instruction to the CXL memory module to inform the CXL memory module of the memory page information required by itself. For example, the memory request instruction may indicate that the space of 5 memory pages needs to be requested, and there should be 3 read-only pages and 2 read-write pages among the 5 memory pages.

When the CXL memory module receives the memory request instruction sent by the host and determines that there is insufficient allocatable memory in the memory chip, the CXL memory module performs data swap, and the CXL memory module swaps or preferentially swaps the data in the read-only page in the memory chip to a free area (a free flash memory page) of the flash memory chip.

In an exemplary embodiment of the present disclosure, the memory data swap method may further include: upon completion of a process using memory, releasing all read-only pages and flash memory pages used by data of the process. When it is in the host leading mode, the memory space occupied by data may be released by the host. When the process using the memory ends and it is determined that the read-only page will no longer be used, the host releases the corresponding memory space and flash memory space.

Figure 5:
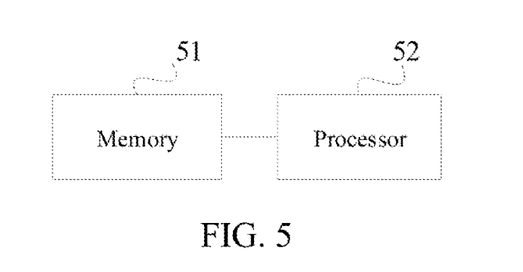
FIG. 5 is a block diagram of a structure of a host according to an embodiment of the present disclosure.

FIG. 5 is a block diagram of a structure of a host according to an embodiment of the present disclosure. The host may be connected to a CXL memory module provided with a flash memory chip and a memory chip (such as a DRAM chip) through a CXL interface. As shown in FIG. 5, the host may include a memory 51 and a processor 52.

The memory is configured to store execution instructions, and the processor may be a Central Processing Unit (CPU), or an Application Specific Integrated Circuit (ASIC), or one or more integrated circuits completing the implementation of the embodiments of the present disclosure. When the host is running, the processor communicates with the memory, and the processor invokes execution instructions to implement the memory data swap method in any embodiment at the side of the host.

Figure 6:
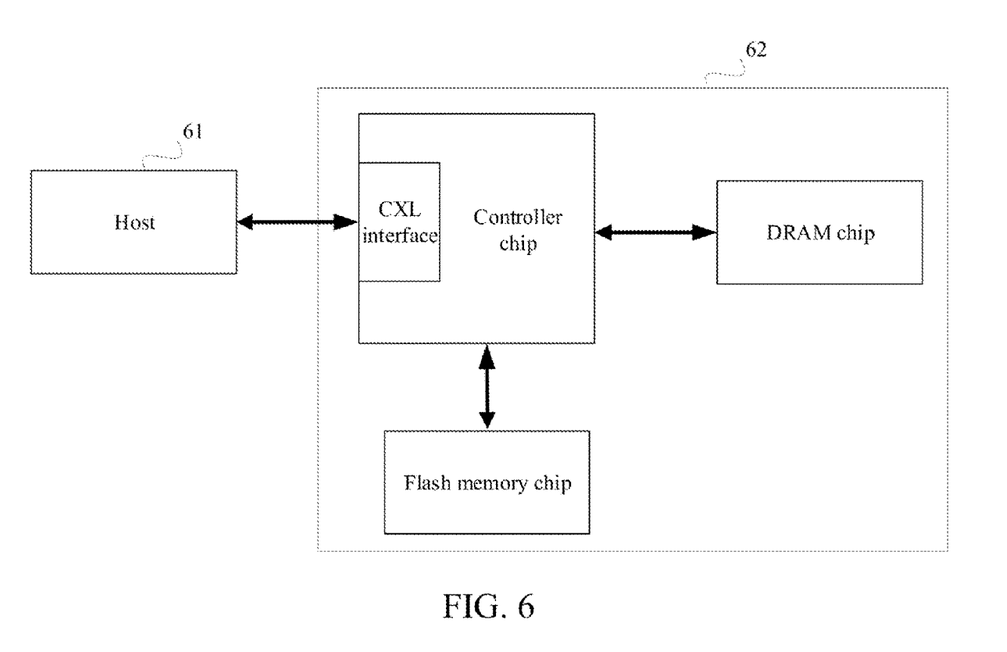
FIG. 6 is a block diagram of a structure of a computer system according to an embodiment of the present disclosure.

FIG. 6 is a block diagram of a structure of a computer system according to an embodiment of the present disclosure. As shown in FIG. 6, the computer system may include a host 61 in any embodiment, and a CXL memory module 62 in any embodiment.

It may be understood by those of ordinary skills in the art that all or some acts in the method and function modules/units in the system and the apparatus in the disclosure may be implemented as software, firmware, hardware, or an appropriate combination thereof. In a hardware implementation, division of the function modules/units mentioned in the above description does not always correspond to division of physical assemblies. For example, a physical assembly may have multiple functions, or a function or an act may be executed by several physical assemblies in cooperation. Some assemblies or all assemblies may be implemented as software executed by a processor such as a digital signal processor or a microprocessor, or implemented as hardware, or implemented as an integrated circuit such as an application specific integrated circuit. Such software may be distributed in a computer-readable medium, and the computer-readable medium may include a computer storage medium (or a non-transitory medium) and a communication medium (or a transitory medium). As known to those of ordinary skills in the art, the term computer storage medium includes volatile and nonvolatile, and removable and irremovable media implemented in any method or technology for storing information (for example, computer-readable instructions, a data structure, a program module, or other data). The computer storage medium includes, but is not limited to, RAM, ROM, EEPROM, a Flash RAM, or another memory technology, CD-ROM, a Digital Versatile Disk (DVD) or another optical disk storage, a magnetic box, a magnetic tape, magnetic disk storage or another magnetic storage apparatus, or any other media that may be used for storing desired information and may be accessed by a computer. In addition, it is known to those of ordinary skills in the art that the communication medium usually includes computer-readable instructions, a data structure, a program module, or other data in a modulated data signal of, such as, a carrier or another transmission mechanism, and may include any information delivery medium.

From the foregoing, it will be appreciated that specific embodiments of the invention have been described herein for purposes of illustration, but that various modifications may be made without deviating from the scope of the invention. Accordingly, the invention is not limited except as by the appended claims.

What is claimed is:

1. A CXL memory module, comprising a flash memory chip, a memory chip, and a controller chip connected to the flash memory chip and the memory chip, wherein the controller chip is configured to be able to swap a part of data in the memory chip into the flash memory chip when there is insufficient memory space in the memory chip;
   wherein the controller chip is configured to perform data swap by the following: when the controller chip receives a memory request instruction sent by an external device and/or the controller chip manages a memory, the controller chip determines that there is insufficient allocatable memory in the memory chip, initiates data swap, and swaps a part of the data in the memory chip into a free area of the flash memory chip; wherein the controller chip runs a virtual memory, and maintains a correspondence of a logical address, a memory address and a flash memory address of data in a logical address-physical address translation table;
   or
   the controller chip is configured to perform data swap by the following: the controller chip receives a swap-out instruction which is sent by an external device when the external device determines there is insufficient memory space in the memory chip, wherein the swap-out instruction carries an address of a first memory page in which data is stored, the controller chip selects a free first flash memory page from the flash memory chip, swaps the data in the first memory page into the first flash memory page, and returns the address of the first flash memory page to the external device;
   or,
   the controller chip is configured to perform data swap by the following: the controller chip receives a swap-out instruction which is sent by an external device when the external device determines there is insufficient memory space in the memory chip, wherein the swap-out instruction carries an address of a first memory page in which data is stored and an address of a free first flash memory page, the controller chip swaps the data in the first memory page into the first flash memory page, and returns a swap-out completion response to the external device;
   wherein the memory request instruction carries a read-write attribute for each requested memory page, and the read-write attribute is a read-only page or a read-write page; the controller chip, when initiating data swap, swaps only data in a read-only page in the memory chip, or preferentially swaps the data in the read-only page in the memory chip; or, the controller chip is further configured to count usage time of memory pages in the memory chip; the controller chip, when initiating data swap, swaps only data of memory pages which will not be used in a preset period of time.

2. The CXL memory module according to claim 1, wherein the part of the data in the memory chip comprises a first data in a read-only page in the memory chip, and swapping, by the controller chip, the part of the data in the memory chip into the free area of the flash memory chip, comprises:
   detecting whether the first data is swapped out for a first time; and
   when the first data is swapped out for the first time, swapping the first data into a free flash memory page of the flash memory chip, and recording a flash memory address of the first data as an address of the free flash memory page, and marking the flash memory address of the first data as valid.

3. The CXL memory module according to claim 2, wherein,
   detecting, by the controller chip, whether the first data is swapped out for the first time, comprises:

searching for statuses of a memory address and the flash memory address of the first data;

when determining that the memory address of the first data is valid and the flash memory address of the first data is invalid, deciding that the first data is swapped out for the first time;

when determining that the flash memory address of the first data is valid, deciding that the first data is not swapped out for the first time.

4. The CXL memory module according to claim 3, wherein the controller chip is further configured to:

after the first data is swapped to a free area of the flash memory chip, upon determining that the first data needs to be swapped-in, read the first data from the recorded flash memory address of the first data, write the first data to a free memory page selected from the memory chip, and update the memory address of the first data as an address of the free memory page and mark the memory address of the first data as valid.

5. The CXL memory module according to claim 3, wherein determining, by the controller chip, that the first data needs to be swapped-in, comprises:

receiving a request from an external device to read the first data, wherein the request carries a logical address of the first data;

searching out that the flash memory address of the first data is valid and the memory address of the first data is invalid, determining that the first data needs to be swapped-in;

the controller chip is further configured to, after reading the first data from the recorded flash memory address of the first data, return the read first data to the external device.

6. The CXL memory module according to claim 2, wherein the controller chip is further configured to, directly release the read-only page and mark the memory address of the first data as invalid when the first data is not swapped-out for the first time.

7. The CXL memory module according to claim 1, wherein the controller chip is further configured to, upon completion of a process using memory, release all read-only pages and flash memory pages used by data of the process.

8. The CXL memory module according to claim 1, wherein the first memory page is a read-only page.

9. The CXL memory module according to claim 1, wherein the controller chip is further configured to:

receive a swap-in instruction sent by the external device, wherein the swap-in instruction carries the address of the first flash memory page and an address of a free second memory page;

the controller chip reads the data from the first flash memory page, writes the data into the second memory page, and returns a swap-in completion response to the external device.

10. A memory data swap method, applied to a host connected to a CXL memory module provided with a flash memory chip and a memory chip, comprising:

running, by the host, a virtual memory and maintaining a correspondence of a logical address, a memory address and a flash memory address of data in a logical address-physical address translation table;

sending, by the host, a swap-out instruction to the CXL memory module when determining that there is insufficient memory space, wherein the swap-out instruction carries an address of a first memory page in which data is stored and an address of a free first flash memory page, or carries an address of a first memory page in which the data is stored; and releasing, by the host, the first memory page, marking the memory address of the data as invalid, recording the flash memory address of the data as the address of the first flash memory page and marking the flash memory address of the data as valid, after receiving a swap-out completion response or the address of the first flash memory page sent by the CXL memory module;

wherein the method further comprises:

upon receiving a request to read the data, searching for, by the host, the memory address and the flash memory address of the data according to a logical address of the data;

sending a swap-in instruction to the CXL memory module when the searched-out memory address is invalid and the searched-out flash memory address is valid, wherein the swap-in instruction carries the address of the first flash memory page and an address of a free second memory page; and recording the memory address of the data as the address of the second memory page and marking the memory address of the data as valid after receiving a swap-in completion response returned by the CXL memory module.

11. The method according to claim 10, wherein the first memory page is a read-only page.

12. The method according to claim 10, wherein the method further comprises:

when determining to release the second memory page storing the data, searching for a correspondence and statuses of a logical address, a memory address, and a flash memory address of the data;

when determining that the flash memory address of the data is valid, directly releasing the second memory page, and marking the memory address of the data as invalid.

13. The method according to claim 10, wherein the method further comprises:

reading from and writing to, by the host, the memory according to the logical address;

when the host needs to increase a capacity, sending, by the host, a memory request instruction to the CXL memory module, wherein the memory request instruction carries a read-write attribute for each requested memory page, wherein the read-write attribute is a read-only page or a read-write page.

14. The method according to claim 10, wherein the method further comprises:

upon completion of a process using memory, releasing all read-only pages and flash memory pages used by data of the process.

15. A memory data swap method, applied to a CXL memory module provided with a flash memory chip and a memory chip, comprising:

being able to, by the CXL memory module, swap a part of data in the memory chip into the flash memory chip when there is insufficient memory space in the memory chip;

wherein the CXL memory module performs data swap by the following: when receiving a memory request instruction sent by an external device and/or managing a memory, determining that there is insufficient allocatable memory in the memory chip, initiating data swap, and swapping a part of the data in the memory chip into a free area of the flash memory chip; wherein the CXL memory module runs a virtual memory and maintains a correspondence of a logical address, a memory address and a flash memory address of data in a logical address-physical address translation table;
or
the CXL memory module performs data swap by the following: receiving a swap-out instruction which is sent by an external device when the external device determines there is insufficient memory space in the memory chip, wherein the swap-out instruction carries an address of a first memory page in which data is stored, selecting, by the CXL memory module, a free first flash memory page from the flash memory chip, swapping the data in the first memory page into the first flash memory page, and returning an address of the first flash memory page to the external device;
or,
the CXL memory module performs data swap by the following: receiving a swap-out instruction which is sent by an external device when the external device determines there is insufficient memory space in the memory chip, wherein the swap-out instruction carries an address of a first memory page in which data is stored and an address of a free first flash memory page, swapping, by the CXL memory module, the data in the first memory page into the first flash memory page, and returning a swap-out completion response to the external device;
wherein the memory request instruction carries a read-write attribute for each requested memory page, and the read-write attribute is a read-only page or a read-write page; the CXL memory module, when initiating data swap, swaps only data in the read-only page in the memory chip, or preferentially swaps data in the read-only page in the memory chip; or the method further comprises: counting usage time of memory pages in the memory chip; when initiating data swap, swapping, by the CXL memory module, only data of memory pages which will not be used in a preset period of time.

16. The memory data swap method according to claim 15, wherein the part of the data in the memory chip comprises a first data in a read-only page in the memory chip, and swapping, by the CXL memory module, the part of the data in the memory chip into the free area of the flash memory chip, comprises:
detecting whether the first data is swapped-out for a first time;
when the first data is swapped-out for the first time, swapping the first data into a free flash memory page of the flash memory chip, and recording the flash memory address of the first data as the address of the free flash memory page, and marking the flash memory address of the first data as valid.

17. The memory data swap method according to claim 16, wherein detecting, by the CXL memory module, whether the first data is swapped-out for the first time, comprises:
searching for statuses of the memory address and the flash memory address of the first data;
when determining that the memory address of the first data is valid and the flash memory address of the first data is invalid, deciding that the first data is swapped-out for the first time;
when determining that the flash memory address of the first data is valid, deciding that the first data is not swapped-out for the first time.

18. The memory data swap method according to claim 17, wherein the method further comprises:
after the first data is swapped in a free area of the flash memory chip, upon determining that the first data needs to be swapped-in, reading the first data from the recorded flash memory address of the first data, writing the first data to a free memory page selected from the memory chip, and updating the memory address of the first data as an address of the free memory page and marking the memory address of the first data as valid.

19. The memory data swap method according to claim 17, wherein determining, by the CXL memory module, that the first data needs to be swapped-in, comprises:
receiving a request from an external device to read the first data, wherein the request carries a logical address of the first data;
searching out that the flash memory address of the first data is valid and the memory address of the first data is invalid, determining that the first data needs to be swapped-in;
the method further comprises: after reading the first data from the recorded flash memory address of the first data, returning the read first data to the external device.

20. The memory data swap method according to claim 16, wherein the method further comprises: directly releasing the read-only page when the first data is not swapped-out for the first time, marking the memory address of the first data as invalid.

21. The memory data swap method according to claim 15, wherein the method further comprises:
upon completion of a process using memory, releasing all read-only pages and flash memory pages used by data of the process.

22. The memory data swap method according to claim 15, wherein the first memory page is a read-only page.

23. The memory data swap method according to claim 15, wherein the method further comprises:
receiving, by the CXL memory module, a swap-in instruction sent by the external device, wherein the swap-in instruction carries the address of the first flash memory page and an address of a free second memory page; and
reading, by the CXL memory module, the data from the first flash memory page, writing the data into the second memory page, and returning a swap-in completion response to the external device.

24. A controller chip of a CXL memory module, comprising a memory interface, a flash memory interface, and a storage controller connected to the memory interface and the flash memory interface, wherein the storage controller is configured to perform the method of claim 15.

25. A host, comprising a storage for storing execution instructions and a processor; wherein the processor invokes the execution instruction and is configured to execute the method of claim 10.

26. A computer system, comprising the host of claim 25 and a CXL memory module;
wherein the CXL memory module comprises a flash memory chip, a memory chip, and a controller chip connected to the flash memory chip and the memory chip, wherein the controller chip is configured to be able to swap a part of data in the memory chip into the flash memory chip when there is insufficient memory space in the memory chip;
wherein the controller chip is configured to perform data swap by the following: when the controller chip receives a memory request instruction sent by an external device and/or the controller chip manages a memory, the controller chip determines that there is insufficient allocatable memory in the memory chip, initiates data swap, and swaps a part of the data in the memory chip into a free area of the flash memory chip; wherein the controller chip runs a virtual memory, and maintains a correspondence of a logical address, a memory address and a flash memory address of data in a logical address-physical address translation table;

or the controller chip is configured to perform data swap by the following: the controller chip receives a swap-out instruction which is sent by an external device when the external device determines there is insufficient memory space in the memory chip, wherein the swap-out instruction carries an address of a first memory page in which data is stored, the controller chip selects a free first flash memory page from the flash memory chip, swaps the data in the first memory page into the first flash memory page, and returns the address of the first flash memory page to the external device;

or, the controller chip is configured to perform data swap by the following: the controller chip receives a swap-out instruction which is sent by an external device when the external device determines there is insufficient memory space in the memory chip, wherein the swap-out instruction carries an address of a first memory page in which data is stored and an address of a free first flash memory page, the controller chip swaps the data in the first memory page into the first flash memory page, and returns a swap-out completion response to the external device.

* * * * *